Patented Oct. 23, 1951

2,572,067

UNITED STATES PATENT OFFICE 2,572,067

TRIFLUOROMETHYL DIPHENYLAMINES

Nathan L. Smith, Indian Head, Md.

No Drawing. Application October 30, 1950,
Serial No. 193,015

3 Claims. (Cl. 260—576)

(Granted under the act of March 3, 1883, as
amended April 30, 1928; 370 O. G. 757)

This invention relates to new compounds of the diphenylamine series, more particularly to such containing a trifluoromethyl group.

The new compounds of the invention correspond to the general formula:

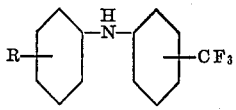

wherein R is hydrogen or an alkyl group.

The new compounds are valuable intermediates for the preparation of the new phenothiazene derivatives described and claimed in my copending application Serial No. 193,013, filed October 30, 1950. The 3-trifluoromethyl compound is a yellow liquid of B. P. 108–110° C./0.3 mm., and yields a picrate from benzene in the form of coarse yellow needles of M. P. 147° C. The 3-trifluoromethyl-3'-methyl compound is a yellow oil of B. P. 130–132° C./1 mm. and the hydrochloride salt thereof melts at 228° C. with decomposition.

The preparation of the new compounds is accomplished by hydrolyzing in hydrochloric acid-alcohol medium the product of the condensation of the corresponding trifluoromethyl acetanilide with bromobenzene or the momo-brominated alkyl benzenes. The condensation is conducted in the presence of a suitable liquid organic diluent, e. g., nitrobenzene, a copper condensing agent, e. g., cuprous bromide, and an acid-binding agent, e. g., anhydrous potassium carbonate. The trifluoromethylated acetanilides may be prepared from the corresponding aminobenzotrifluorides by acetylation with acetic anhydride in known way.

The preparation of the new compounds is illustrated by the following specific examples in which parts are in the metric system and by weight unless otherwise indicated.

Example 1

A mixture of 20.3 parts (0.1 mol) 3-trifluoroacetanilide (M. P. 110° C.), 31.4 parts (0.2 mol) bromobenzene, 15 parts anhydrous potassium carbonate and 0.5 part cuprous bromide in 100 ml. nitrobenzene was stirred and heated under reflux for 21 hours. The nitrobenzene and unchanged bromobenzene were removed by steam distillation and the crude N-acetyl-3-trifluoromethyl diphenylamine (B. P. 125–127° C./0.5 mm.) of the residue hydrolyzed by refluxing for 4 hours with 30 ml. ethanol and 30 ml. concentrated hydrochloric acid. The product of the hydrolysis was poured onto ice, the precipitate extracted with ether, dried over sodium sulfate, the solvent removed by simple distillation. The stripped residue was then distilled to yield the product amine, 3-trifluoromethyl diphenylamine, which was obtained as a yellow liquid B. P. 108–110° C./0.3 mm.

Example 2

A mixture of 50.3 parts (0.25 mol) m-trifluoromethyl acetanilide, 85.5 parts (0.5 mol) m-bromotoluene, 33 parts anhydrous potassium carbonate and 1 part cuprous bromide in 300 ml. dry nitrobenzene was stirred and heated under reflux for 18 hours. The nitrobenzene was removed by steam distillation and the residue heated under reflux for 1 hour with 75 ml. concentrated hydrochloric acid and 75 ml. ethanol. The solvent was removed by simple distillation and the product of the hydrolysis washed thoroughly with water. The amine, 3-trifluoromethyl-3'-methyl diphenylamine, distilled as a yellow oil; B. P. 130–132° C./1 mm.

The invention described herein may be manufactured and used by or for the Government of the United States of America for governmental purposes without the payment of any royalties thereon or therefor.

What is claimed is:

1. A trifluoromethyl diphenylamine of the general formula:

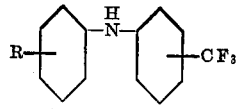

wherein R is selected from the group consisting of hydrogen and the methyl radical.

2. As a new compound, 3-trifluoromethyldiphenylamine.

3. As a new compound, 3-trifluoromethyl-3'-methylphenylamine.

NATHAN L. SMITH.

REFERENCES CITED

The following references are of record in the file of this patent:

UNITED STATES PATENTS

| Number | Name | Date |
|---|---|---|
| 2,212,825 | Daudt et al. | Aug. 27, 1940 |
| 2,432,393 | Dickey et al. | Dec. 9, 1947 |

OTHER REFERENCES

Swarts, Beilstein (Handbuch, 4th Ed.) vol. 12, p. 870 (1929).